Dec. 31, 1929.                 E. W. NILES ET AL                 1,741,375
                         CURRENT EQUALIZING DEVICE
                           Filed Sept. 24, 1928

INVENTORS
E.W. Niles and W.H. Edwards
BY
ATTORNEY

Patented Dec. 31, 1929

1,741,375

UNITED STATES PATENT OFFICE

ELIOT W. NILES, OF BLOOMFIELD, NEW JERSEY, AND WILLIAM H. EDWARDS, OF BAYSIDE, NEW YORK, ASSIGNORS TO AMERICAN TELEPHONE AND TELEGRAPH COMPANY, A CORPORATION OF NEW YORK

CURRENT-EQUALIZING DEVICE

Application filed September 24, 1928. Serial No. 307,834.

This invention relates to electrical circuits and more particularly to arrangements tending to equalize the currents flowing in such circuits, or in other words, to minimize the fluctuations of such currents.

It has been found that rectifiers of the contact variety, such for example as the copper oxide rectifier, when poled to oppose the flow of current in a circuit, will have certain resistance-current characteristics. In other words, when a rectifier of this type is poled to oppose the current flow, there is found to be a portion of the resistance-current curve on which the resistance of the rectifier will decrease upon a decrease in current flow and will increase upon an increase of current flow. It is the primary object of the arrangements of the invention to utilize in a circuit employing currents of a certain magnitude a rectifier of the contact variety poled to oppose the flow of such currents for the purpose of minimizing the fluctuations of such currents.

The use of a rectifier of the contact variety poled to oppose the current flow as a means for tending to equalize the current flow has the advantage over the use of resistance lamps that the rectifier device is instantaneous in its action and is not dependent upon the preliminary heating of the filaments of such lamps. Furthermore, this type of rectifier device offers an extremely simple and sturdy means for accomplishing the desired purpose. These devices also possess the advantages over prior devices of being very compact and of such simple form that they are capable of being connected in series or parallel with little expense for mounting means. Other features and objects of the arrangements of the invention will appear more fully from the detailed description thereof hereinafter given.

Figure 1:
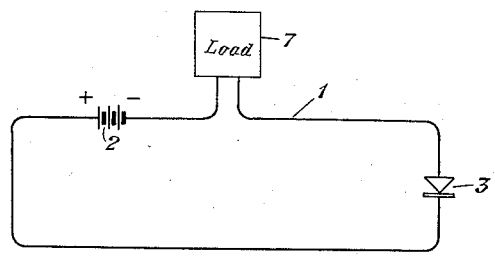
Figure 2:
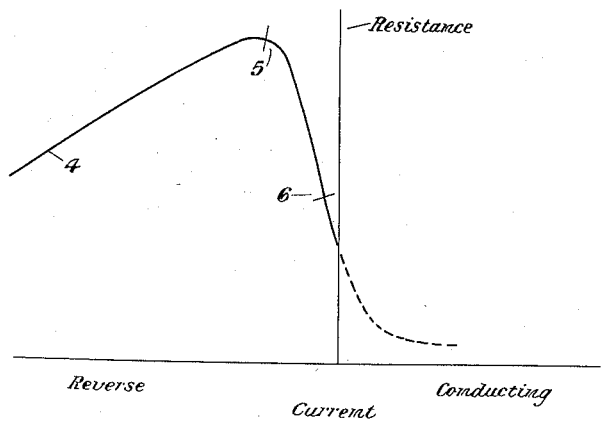

The invention may be more fully understood from the following description together with the accompanying drawing in the Figures 1 and 2 of which the invention is illustrated. Fig. 1 is a circuit diagram showing one form of the invention. In Fig. 2 is a graphical illustration of certain of the operating principles of the invention.

In Fig. 1 is shown a circuit 1 having included in series therein a load 7, a source of current 2, and a rectifier device 3. The rectifier device 3 may be composed of one or more rectifiers of the contact variety, such for example as copper oxide rectifiers. While only one rectifier unit is shown, it is pointed out that the device 3 may comprise a number of units connected in series or parallel. The rectifier device 3 will be so poled as to oppose the current flow from the source 2 to the load 7.

In Fig. 2 is shown a graphical representation of the resistance-current curve 4 of the rectifier device 3 when poled to oppose the current flow from source 2 in the circuit 1. It will be seen that on that portion of curve 4 between the points 5 and 6 that as the current decreases, the resistance also decreases, and vice versa. Accordingly, by adjusting for operation on this portion of the curve, it is possible to minimize fluctuations in the current transmitted from the source 2 to the load 3. This adjustment for operation on this portion of the curve may be made by proper choice of the voltage of source 2 and by combining more or less rectifier units in series or parallel to form the device 3.

While the invention has been disclosed as embodied in certain specific arrangements which are deemed desirable, it is understood that it is capable of embodiment in other forms without departing from the spirit of the invention as defined by the appended claims.

What is claimed is:

1. An electrical circuit comprising in series a load, a source of current, and a device for minimizing variations in the current flow from said source to said load, said device comprising a contact rectifier of the electronic type poled to oppose the flow of current from said source.

2. An electrical circuit comprising in series a load, a source of current, and a contact rectifier device of the electronic type, said rectifier device being so poled and the constants of said source and said rectifier device being so chosen that the circuit will operate on that portion of the resistance-current curve of said device on which the resistance will increase or decrease, respectively, upon an increase or decrease in said current.

3. An electrical circuit comprising in series a load, a source of current, and a device for substantially instantaneously minimizing variations in the current flow from said source to said load, said device comprising a contact rectifier of the electronic type poled to oppose the flow of current from said source.

In testimony whereof, we have signed our names to this specification this 22nd day of September, 1928.

ELIOT W. NILES.
WILLIAM H. EDWARDS.